United States Patent
Shin

(10) Patent No.: US 7,263,525 B2
(45) Date of Patent: Aug. 28, 2007

(54) QUERY PROCESSING METHOD FOR SEARCHING XML DATA

(75) Inventor: Hyoseop Shin, Seoul (KR)

(73) Assignee: Samsung Electronics Co., Ltd., Kyungki-do (KR)

( * ) Notice: Subject to any disclaimer, the term of this patent is extended or adjusted under 35 U.S.C. 154(b) by 445 days.

(21) Appl. No.: 10/641,084

(22) Filed: Aug. 15, 2003

(65) Prior Publication Data

US 2004/0083209 A1  Apr. 29, 2004

(30) Foreign Application Priority Data

Oct. 23, 2002  (KR) .................. 10-2002-0065026

(51) Int. Cl.
  G06F 17/30  (2006.01)
(52) U.S. Cl. .................. 707/10; 715/513
(58) Field of Classification Search .......... 707/1–10, 707/100–104.1, 200–206; 715/513; 714/4
  See application file for complete search history.

(56) References Cited

U.S. PATENT DOCUMENTS

| | | | |
|---|---|---|---|
| 5,970,490 A | 10/1999 | Morgenstern | |
| 6,240,407 B1 | 5/2001 | Chang et al. | |
| 6,366,934 B1 | 4/2002 | Cheng et al. | |
| 6,421,656 B1 | 7/2002 | Cheng et al. | |
| 6,754,843 B1 * | 6/2004 | Lu et al. | 714/4 |
| 2004/0098667 A1 * | 5/2004 | Atkinson | 715/513 |
| 2006/0005122 A1 * | 1/2006 | Lemoine | 715/513 |

FOREIGN PATENT DOCUMENTS

| | | |
|---|---|---|
| KR | 2001-0045025 A | 6/2001 |
| KR | 2001-0064252 A | 7/2001 |
| KR | 2001-0109665 A | 12/2001 |
| KR | 2002-0058639 A | 7/2002 |

* cited by examiner

*Primary Examiner*—Diane D. Mizrahi
(74) *Attorney, Agent, or Firm*—Sughrue Mion, PLLC

(57) ABSTRACT

The present invention relates to a query processing method for searching XML data by which performance of XML query processing can be improved by equivalence class and a path expression reduction algorithm. The query processing method of the present invention includes a step of checking duplication of nodes found while an input XML document is parsed to reconstruct the XML document, storing other nodes, from which duplicated nodes checked in the checking step are excluded, in the form of an additional tree structure, and when a user inputs a query for XML data search, converting a path expression in the input query into the shortest path expression while traversing the tree structure.

20 Claims, 6 Drawing Sheets

```
Algorithm PathCompaction
input: XIS-Tree xistree   /* Input section*/
       path expression A₁N₁ A₂N₂ ... AₖNₖ
output: compacted path expression   /* Output section */ begin
    Head := empty sequence set;
    Tail := { A₁N₁, A₂N₂, ..., AₖNₖ };
    for each i between 1 and k-1 // for each pair AᵢNᵢ  /* traverse i-th
    begin                                               <axis-node> pair, AᵢNᵢ */
        removable := TRUE;
        pathelement := RemoveFirstPathElement(Tail);   // AᵢNᵢ;
        HeadNodeList := findPatternInXISTree(xistree->root, Head);
        for each HeadNode in HeadNodeList            /* Search for nodes of
        begin                                           Tail pattern in XIS tree */
            TailNodeList := findPatternInXISTree (xistree->HeadNode, Tail);
            for each TailNode in TailNodeList
            begin
                if ( pathelement is not a prefix of TailNode )
                begin
                    removable := FALSE;
                    break;
                end
            end
            if ( ! removable )
                break;
        end                          /* If prefix of node of Tail
                                        pattern is AᵢNᵢ, relevant AᵢNᵢ is
                                        deleted and axis of Tail is
                                        changed from '/' to '//'.*/
        if ( ! removable )
            AttachPathElement(Head, pathelement);
        else
            FirstPathElement(Tail).AXIS := '//';
    end
    return compacted path expression Head;
```

FIG. 3

Algorithm PathCompaction input: XIS-Tree xistree   /* Input section*/ path expression $A_1N_1\ A_2N_2\ ...\ A_kN_k$ output: compacted path expression   /* Output section */ begin

Head := empty sequence set;

Tail := { $A_1N_1, A_2N_2, ..., A_kN_k$ };

for each i between 1 and k-1 // for each pair $A_iN_i$   /* traverse i-th begin                                                     <axis-node> pair, $A_iN_i$ */ removable := TRUE;

pathelement := RemoveFirstPathElement(Tail);   // $A_iN_i$;

HeadNodeList := findPatternInXISTree(xistree->root, Head);

for each HeadNode in HeadNodeList         /* Search for nodes of begin                                       Tail pattern in XIS tree */

TailNodeList := findPatternInXISTree (xistree->HeadNode, Tail);

for each TailNode in TailNodeList begin if ( pathelement is not a prefix of TailNode )

begin removable := FALSE;

break;

end end if ( ! removable )

break;

end                                     /* If prefix of node of Tail pattern is $A_iN_i$,  relevant $A_iN_i$ is deleted and axis of Tail is changed from '/' to '//'.*/ if ( ! removable )

AttachPathElement(Head, pathelement);

else

FirstPathElement(Tail).AXIS := '//';

end return compacted path expression Head;

RELATED ART (a)
```
<A>
 <B>
  <A>
   <C> value1 </C>
   <C> value2 </C>
   <D> value3 </D>
  </A>
  <D> value4 </D>
 </B>
 <B>
  <D> value5 </D>
  <D> value6 </D>
 </B>
 <C> value7 </C>
</A>
```

(b)

RELATED ART

RELATED ART

QUERY PROCESSING METHOD FOR SEARCHING XML DATA

BACKGROUND OF THE INVENTION

This application claims the priority of Korean Patent Application No. 10-2002-0065026 filed on Oct. 23, 2002, in the Korean Intellectual Property Office, the disclosure of which is incorporated herein in its entirety by reference.

1. Field of the Invention

The present invention relates to a method for searching XML data, and more particularly, to a query processing method for searching XML data by which performance of XML query processing can be improved by use of equivalence class and a path expression reduction algorithm.

2. Description of the Related Art

The Extended Markup Language (XML) is a markup language adopted as a recommendation by the W3C (World Wide Web Consortium) in 1998 to compensate for weaknesses of HTML (HyperText Markup Language) (See XML 1.0 W3C Recommendation, Feb. 10, 1998). As shown in FIG. 4, when a document is defined in XML format, the document structure, content and output format thereof are divided so that XML can provide characteristics related to document structuring, such as reusability of the document structure, flexibility of the output format, and search function for the document structure.

As a result, the spread of XML documents will likely accelerate in the future. Accordingly, research for efficiently storing, searching and retrieving information in documents using information in the XML document structure is in progress.

FIG. 5a shows an example of an XML document. The document shown in FIG. 5a is constructed in the form of a tree as shown in FIG. 5b. Thus, it is possible to search or retrieve the document structure. To support the search for XML documents, a database (for example, a Relational DBMS, an Object-Oriented DBMS, or an XML-dedicated DBMS) is required. In the related art, an XML query language is used for searching or retrieving XML data.

The XML query languages include, for example, an XQL (XML Query Language), Query (A Query Language for XML). Each XML query language uses a special specification called an Xpath (XML Path Language) indicating paths of elements or text in the XML document when representing the query. In the Xpath specification, relationships between the elements or nodes are represented using operators '/' or '//', in which the '/' operator represents a child node of a specific element and the '//' operator represents the specific element itself or its descendant node.

In the example of the XML document shown in FIG. 5a, if the query "A//B" is performed, respective nodes of the tree shown in FIG. 5b are traversed to search for nodes having a B element among descendant nodes of an A element. Likewise, if the query "A/C" is performed, respective nodes of the tree are traversed to search for nodes having a C element among descendent nodes of an A element. Herein, "A//B" or "A/C" is defined as a path expression contained in a query.

Specifically, in a method in which XML documents are divisionally stored according to respective nodes of the elements as shown in FIG. 6, processing costs increase in proportion to the number of nodes on the path expression (i.e. the length of the path expression). In other words, to search for a specific element, complex join operations for joining data from two or more respective tables in which the elements are stored are required. Furthermore, the join operations are very critical, which significantly impact the performance of the database. Therefore, maximum reduction of the number of join operations is useful in improving system performance.

For example, a path expression /A/B/A/C/ may be represented as other path expressions //B/A/C, /A//B//C and //B//C which designate the same node using the operators '/' or '//'. When processing each of the path expressions, the path expression /A/B/A/C requires three join operations as described in $(((A \bowtie B) \bowtie A) \bowtie C)$, and the path expression //B/A/C requires two join operations as described in $((B \bowtie A) \bowtie C)$. On the other hand, the path expression //B/C requires only one join operation as described in $(B \bowtie C)$. Thus, the expression //B/C reduces costs for path expression processing as compared with a case where two or three join operations are required. Herein, it should be noted that $\bowtie$ is a symbol indicating a join operation.

As described above, it will be understood that the processing of path expressions for XML data is very important when queries are performed. Related art for processing path expressions is disclosed in the following technical documents:

1. C. Zhang, J. Naughton, D. Dewitt, Q. Luo, and G. Lohman, "On supporting containment queries in relational database management systems", In Proceedings of 2001 ACM-SIGMO conference, Santa Barbara, Calif., 2001;

2. Quanzhong Li, Bongki Moon, "Indexing and querying XML data for regular path expressions", In Proceedings of 2001 VLDB conference, pp. 361–370, Roma, Italy, 2001; and 3. Divesh Srivastava, Shurug Al-Khalifa, H. V. Jagadish, Nick Koudas, Jignesh M. Patel, Yuqing Wu, "Structural Joins: A Primitive for Efficient XML Query Pattern Matching", In Proceedings of 2002 IEEE Conference on Data Engineering (ICED), San Jose, Calif., 2002.

To support the search function for large volumes of XML documents, the prior technical documents 1 and 2 use the containment relationships between elements for parsing an XML document, storing elements in the XML document into a database in the form of a tuple serving as an independent unit, and processing the path expression. In addition, the prior technical document 3 proposes improved join algorithms for efficiently performing path join operations based on the containment relationship, where the join operations are performed by tree-merge join and stack-tree algorithms.

The prior technical documents have created the groundwork for techniques of processing the path expressions using the join operations. However, there is a related art problem in that search performance can be critically degraded, since the join operations must be performed every time the path expressions become longer or more complex.

SUMMARY OF THE INVENTION

The present invention is contemplated to solve the problems in the prior arts. An object of the present invention is to provide a method for allowing a path expression for a query inputted by a user to be converted into the shortest path expression possible so that performance of query processing can be maximized.

According to the present invention for achieving the object, there is provided a method of processing a query for searching XML data, comprising the steps of checking duplication of nodes found while an input XML document is parsed to reconstruct the input XML document, storing nodes other than duplicated nodes checked in the checking step, said storing performed as a tree structure, and converting a path expression in an input query into a shortest path expression while traversing the tree structure when a user inputs the query for an XML data search.

Preferably, shared or recursive nodes are not included in the tree structure, and only one child node is registered in the tree structure in a case where a parent node has a plurality of child nodes with an identical name.

Further, it is preferred that the shortest path expression be a set of nodes belonging to a same equivalence class in the tree structure.

Preferably, the path expression P in the query is represented as $P=A_1N_1 A_2N_2 \ldots A_kN_k$ and classified into a Head section, an $A_iN_i$ section, and a Tail section when if a length of the path expression is k. Herein, the $A_iN_i$ section denotes first to i-th <axis-node> pairs for the path expression, the the Head section is a part in which reduction has been made among lists of the <axis-node> pairs located before the $A_iN_i$ section, and the Tail section is a part in which the reduction is not yet made among lists of the <axis-node> pairs located after the $A_iN_i$ section.

More preferably, the query processing method of the present invention further comprises the step of generating the shortest path expression by searching the first to i-th <axis-node> pairs and the $A_iN_i$ section to determine whether respective pairs can be deleted.

Furthermore, the method of determining whether respective pairs can be deleted comprises the steps of searching a node of the Tail section from a sub-tree in which a node indicated by the Head section becomes a root node; deleting the AiNi section when the node of the Tail section has the prefix AiNi; and, changing an axis of the Tail section from '/' to '//'.

Preferably, the tree structure resides in main memory or is stored on a disk.

Additionally, a system for processing a query for searching XML data is provided, comprising a XML query parser that receives an input document from a user and parses said input XML document to generate a reconstructed input XML document, and a XML path expression reducer that receives said reconstructed input XML document, traverses a XML Instance Structure (XIS) tree to check for duplication of nodes, and returns a shortest path expression to said XML query parser, wherein said XIS tree includes nodes other than nodes duplicated in said input XML document, and stored as a tree structure. Further, a XML query processor receives said returned shortest path query from said XML query parser, performs said query by extracting a result from a XML database, and provides said result to said user.

BRIEF DESCRIPTION OF THE DRAWINGS

The above and other objects, features and advantages of the present invention will become apparent from the following description of a preferred embodiment given in conjunction with the accompanying drawings, in which:

FIG. 3 is an example of a path reduction algorithm according to an exemplary, non-limiting embodiment of the present invention;

DETAILED DESCRIPTION OF THE INVENTION

Hereinafter, the present invention will be explained in detail with reference to the accompanying drawings.

1. System Overview

A method proposed in the present invention is employed in an XML database server for providing services for storing and searching XML documents. For example, but not by way of limitation, the method of the present invention can be utilized in XML systems, such as metadata engines for processing electronic program guide (EPG) data represented in XML in a broadcasting environment, search systems for electronic documents in an XML syntax, and XML web search engines.

Figure 1:
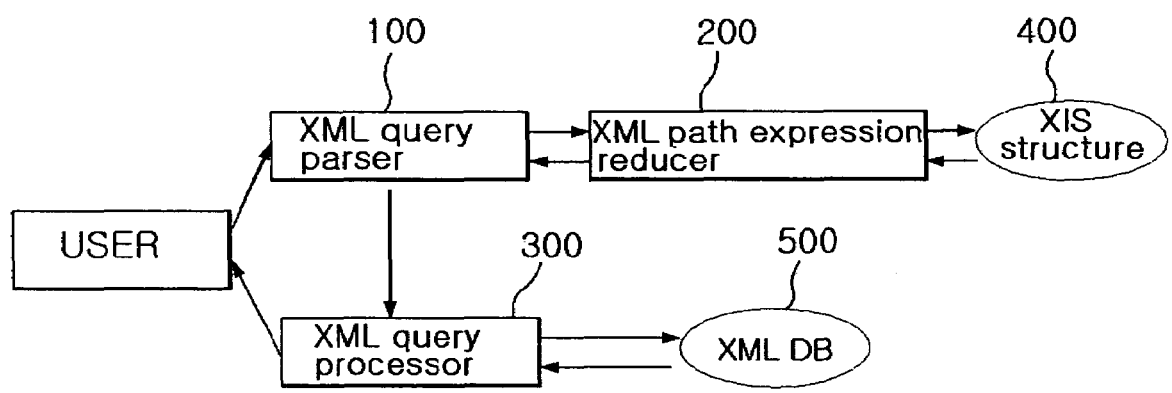
FIG. 1 is a block diagram schematically illustrating an XML query system according to an exemplary, non-limiting embodiment of the present invention.

FIG. 1 is a block diagram schematically illustrating an XML query system according to an exemplary, non-limiting embodiment of the present invention. As shown in FIG. 1, the XML query system includes an XML query parser 100, an XML path expression reducer 200, and an XML query processor 300.

If a user inputs a specific query, the XML query parser 100 analyzes or parses a path expression for the query, and sends the parsed path expression to the XML path expression reducer 200. Then, as will be described later, the XML path expression reducer 200 traverses an XIS (XML Instance Structure) tree 400, which has a tree data structure composed of nodes other than nodes duplicated while parsing an XML document input in the XML query system, and returns the shortest path expression in an equivalent class of the relevant path expression to the XML query parser 100.

Then, the XML query processor 300 performs the query with the returned path expression, and provides the user with a result for the relevant query by extracting the result from the XML database 500.

2. XIS Tree (XML Instance Structure Tree)

2-1. Definition of the XIS Tree

The term "XIS tree" represents a data structure used in an exemplary, non-limiting embodiment of the present invention. According to the XIS tree, the tree data structure is composed of nodes other than the nodes duplicated while parsing an XML document that was input to the XML query system. That is, the XIS tree is constructed based on an actual structure of the input XML document. The duplicated nodes are removed, and neither shared nodes nor recursive nodes exist. In addition, the XIS tree is different from the input XML document, as when one parent node has a plurality of child nodes with the same name, only one node can be registered in the XIS tree.

2-2 Generation of XIS Tree

The XIS tree is gradually generated while reconstructing an XML document when the XML document is loaded. The nodes of the XIS tree are found while elements or attributes in the XML document are traversed in accordance with a tree traversal algorithm such as a pre-order algorithm, an in-order algorithm, and a post-order algorithm during the process of parsing the input XML document. The nodes are added to the XIS tree. As described above, the XIS tree is different from the input XML document in terms of structure, as duplicated nodes are not input therein.

Figure 5:
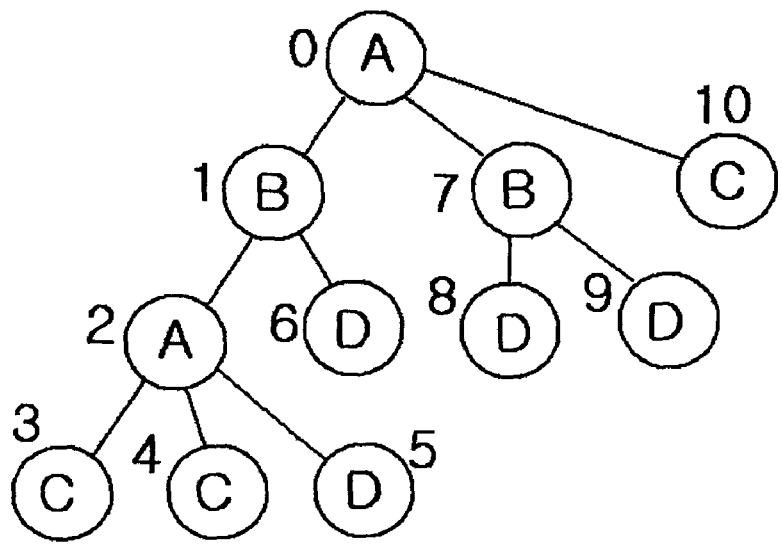
FIG. 5a illustrates an example of a related art XML document.
FIG. 5b illustrates a tree structure representing the related art XML document.
Figure 6:
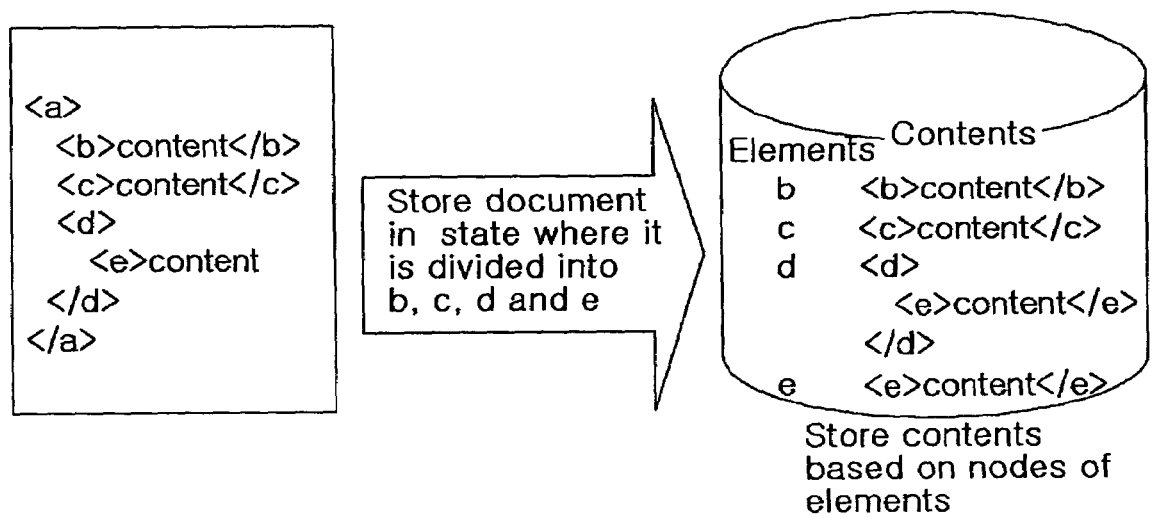
FIG. 6 is a diagram for explaining how to divisionally store the related art XML document according to element nodes.

When the XML document with the same structure as shown in FIG. 5b is loaded, the XIS tree is generated as discussed below.

For example, but not by way of limitation, when the document shown in FIG. 5b is traversed in accordance with the pre-order tree traversal algorithm, the nodes are searched in the order of A(0)→B(1)→A(2)→C(3)→C(4)→D(5)→D (6)→B(7)→D(8)→D(9)→C(10). Here, the numbers in parentheses indicate the order of node traversal. While searching respective nodes in this order, it is determined whether the duplicated nodes exist.

For example, but not by way of limitation, since the fourth C-node is identical to the previous third C-node, it is not added to the XIS tree. Similarly, the seventh B-node is not recorded in the XIS tree, since the first B-node already exists as a B-node immediately after the zeroth root node. Likewise, the eighth and ninth D-nodes are also not added to the XIS tree, since the sixth D-node exists as a D-node immediately after a second level B-node. These relationships are clearly shown in Table 1 below.

TABLE 1

Figure 2:
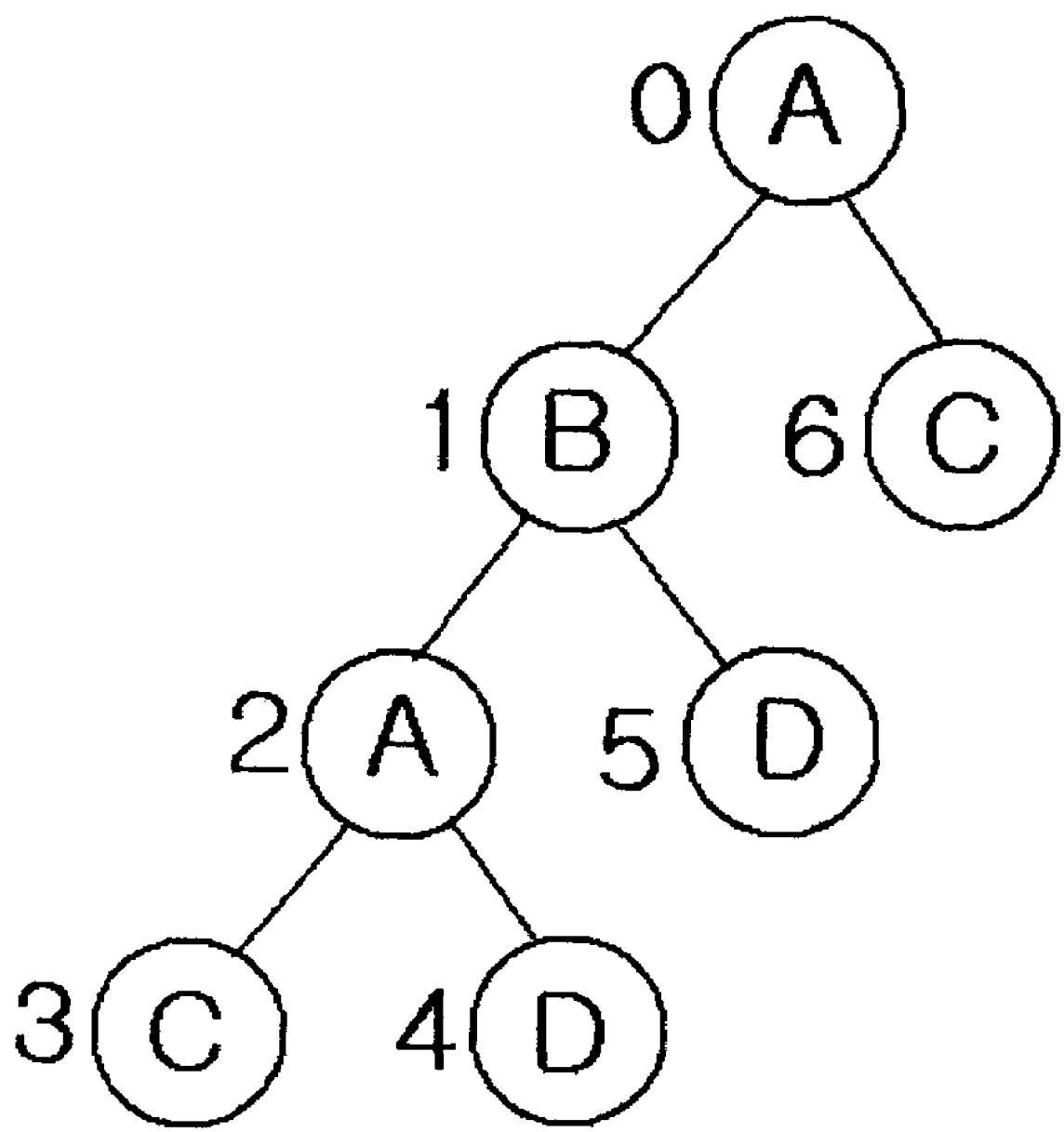
FIG. 2 is a diagram showing an XIS tree according to an exemplary, non-limiting embodiment of the present invention.
Figure 4:
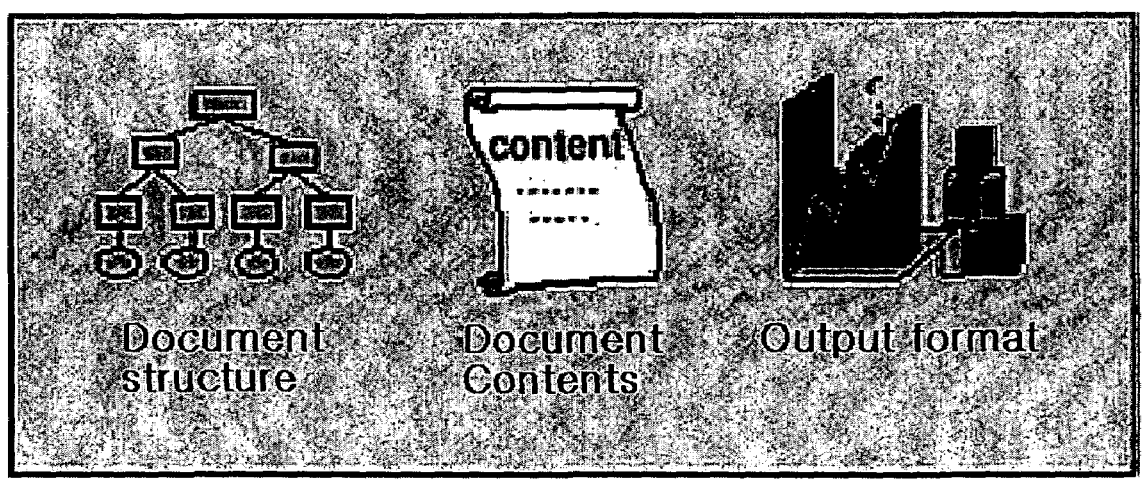
FIG. 4 is a diagram showing a related art XML document structure.

| Node Number in FIG. 5b | 0 | 1 | 2 | 3 | 4 | 5 | 6 | 7 | 8 | 9 | 10 |
|---|---|---|---|---|---|---|---|---|---|---|---|
| Node Number in FIG. 2 | 0 | 1 | 2 | 3 | X | 4 | 5 | X | X | X | 6 |

Therefore, only nodes such as A(0), B(1), A(2), C(3), D(5), D(6) and C(10) are recorded in the XIS tree, and are represented as the tree structure illustrated in FIG. 2.

Although two or more XML documents are input, only one XIS tree exists, and processing of duplicated nodes is performed in substantially the same manner as above. For example, but not by way of limitation, if there are a plurality of root nodes in the input documents, the XIS tree is constructed such that a dummy node is first set as a new root node, and the root nodes of the respective documents are regarded as child nodes of the dummy node.

2-3 Storage of the XIS Tree

Since the XIS tree is much smaller than the input XML document in view of their size, the XIS tree can reside in main memory.

If the XIS tree is stored on a disk, the XIS tree is stored according to the following methods:

(1) Storage in XML Format

The XML tree itself is represented in the XML format and then stored on the disk. That is, when storing the XML tree, each node of the XIS tree is represented as a tag, while each of end nodes is represented as an empty tag. For example, but not by way of limitation, the XIS tree shown in FIG. 2 is represented as follows, and the XIS tree stored in the XML format can be read through a general XML parsing procedure:

<A><B><A><C/><D/></A><D/></B><C/></A>

(2) Storage in a Relational Database

In addition, the XIS tree can be stored in a relational database in the form of a table. Here, each node of the tree is stored as a single tuple, of which a structure becomes <node_id, parent_id, nodename>. The node_id is a number serving as a key used for classifying respective nodes in the XIS tree, and the parent_id indicates the node_id of its own parent node in the XIS tree. In addition, the nodename is a tag name of the relevant node. Conversely, the XIS tree stored in the form of a table can be restored by recursively referring to the values of the node_id and the parent_id.

3. Path Expression Reduction Algorithm 3-1. Concept of the Equivalence Class

Equivalence class is defined as a set of identical nodes in the XIS tree for an input XML document. That is, path expressions designating the same nodes in the aforementioned XIS tree belong to the same class. As described above, in Xpath, the same nodes are designated using the operators '/' or '//'. In the XIS tree shown in FIG. 2, the path expression designating the third C-node is represented as {/A/B/A/C, //B/A/C, /A//B//C, //B//C}, for example.

As described above, in the method in which XML data is divisionally stored according to nodes, processing costs increase in proportion to the number of nodes on the path expression. Therefore, even though the user may represent a desired path expression as an absolute path expression having a large length such as /A/B/A/C, query processing can be performed more efficiently by allowing the represented path expression to be converted into the shortest path expression //B/C.

3-2. Path Expression Reduction Algorithm

The path expression reduction algorithm according to an exemplary, non-limiting embodiment of the present invention can be defined as an algorithm for allowing the path expression input by a user to be converted into the shortest one among the equivalence class to which the path expression belongs through the aforementioned XIS tree and the concept of equivalence class.

First, the XIS tree and the path expression are input. If the path expression having the length k is input, the path expression P can be represented as follows:

$P = A_1N_1 A_2N_2 \ldots A_kN_k$.

The input path expression is classified into three component (i.e. Head, $A_iN_i$ (1<i<k-1), and Tail). The $A_iN_i$ represents an i-th <axis-node> pair, the Head is a part in which the reduction has been made among lists of the <axis-node> pairs located before the $A_iN_i$ in the path expression, and the Tail is a part in which the reduction is not yet made among lists of the <axis-node> pairs located after the $A_iN_i$ in the path expression.

The shortest path expression can be generated by searching the i-th <axis-node> pair, i.e. $A_iN_i$ in a predetermined order and simultaneously determining whether it can be deleted, with respect to the path expression to be reduced. Herein, it is determined through traversal of the XIS tree whether the i-th <axis-node> pair, i.e. $A_iN_i$ can be deleted.

More specifically, in a sub-tree of the XIS tree in which a node indicated by the Head becomes a root node, a node matched with a Tail pattern is searched. If there is a prefix of the Tail different from $A_iN_i$, the corresponding $A_iN_i$ becomes an undeletable node. Otherwise, the $A_iN_i$ becomes deletable. At this time, the axis of the Tail is changed from '/' to '//'.

Preferred Embodiment

When the path expression for the XML document shown in FIG. 5a is provided as /A/B/A/C, the reduction procedure in which the XIS tree shown in FIG. 2 is used will be explained as follows.

Since the length k of the path expression is 4, the XIS tree is searched up to the third <axis-node> pairs in the predetermined order, and it is then determined whether the <axis-node> pairs can be deleted.

In a first iteration of this algorithm, the three components of the path expression are set as follows:

Head=Null
$A_1N_1$=/A
Tail=B/A/C.

Since Head is set to 'Null', Head indicates the root node in the XIS tree of FIG. 2. If the node from the sub-tree indicating a Head path '/' to the Tail pattern '/B/A/C' is retrieved from the XIS tree, it is known to be '/A/B/A/C'. Since its prefix is '/A(A1N1)', the '/A(A1N1)' is deleted. Therefore, Head is still 'Null', and the first axis of Tail is changed from '/' to '//'.

In a second loop of the algorithm, the components of the path expression are set as follows:

Head=Null
$A_2N_2$=//B
Tail=A/C.

Since Head is set to 'Null', Head indicates the root node in the XIS tree. When nodes ranging from the root node to the Tail pattern 'A/C' are searched, it is known that '/A/B/A/C' and '/A/C' exist. Since '/A/B/A/C' is a Tail having the prefix $A_2N_2$(//B) while '/A/C' is a pattern not having the prefix $A_2N_2$(//B), it is impossible to delete $A_2N_2$(//B). Therefore, Head is changed from 'Null' to '//B'.

In a third loop of the algorithm, the components of the path expression are set as follows:

Head=//B,
$A_3N_3$=/A
Tail=C.

Since the node from the sub-tree, in which a first node indicated by Head is set as a root node, to the Tail pattern 'C' is '/A/C' and its prefix is $A_3N_3$(/A), it is possible to delete '/A'.

Therefore, the finally reduced path expression becomes '//B/C'. Consequently, a path expression having a length of 4 is reduced to a path expression having a length of 2.

As described above, according to the present invention, an arbitrary path expression for a query can be converted into the shortest other path expression in the equivalence class using the XIS tree, and the concept of equivalence class when processing the query. Therefore, there is an advantage in that search performance can be maximized.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A method of processing a query for searching XML data, comprising the steps of:
   checking duplication of nodes found while an input XML document is parsed to reconstruct the input XML document;
   storing nodes other than duplicated nodes checked in the checking step, said storing performed as a tree structure; and
   converting a path expression in an input query into a shortest path expression while traversing the tree structure when a user inputs the query for an XML data search.

2. The method as claimed in claim 1, wherein shared or recursive nodes are not included in the tree structure, and only one child node is registered in the tree structure when a parent node has a plurality of child nodes that have corresponding names that are identical with respect to each other.

3. The method as claimed in claim 1, wherein the shortest path expression is a set of nodes belonging to a same equivalence class in the tree structure.

4. The method as claimed in claim 1, wherein a path expression P in the query is represented as P=$A_1N_1A_2$ $N_2 \ldots A_kN_k$ and is classified into a Head section, an $A_iN_i$ section, and a Tail section when a length of the path expression is k, and AN denotes <axis-node> pairs for the path expression P.

5. The method as claimed in claim 4, wherein the $A_iN_i$ section denotes first to i-th <axis-node> pairs for the path expression P, the Head section is a part in which reduction has been made among lists of the <axis-node> pairs located before the $A_iN_i$ section, and the Tail section is a part in which the reduction has not yet been made among lists of the <axis-node> pairs located after the $A_iN_i$ section.

6. The method as claimed in claim 4, further comprising the step of generating the shortest path expression by searching the first to i-th <axis-node> pairs and the $A_iN_i$ section to determine whether respective the first to i-th <axis-node> pairs can be deleted.

7. The method as claimed in claim 6, wherein the determining whether respective pairs can be deleted comprises the steps of:
   searching a node of the Tail section from a sub-tree in which a node indicated by the Head section becomes a root node;
   deleting the AiNi section when the node of the Tail section has a prefix AiNi; and
   changing an axis of the Tail section from '/' to '//'.

8. The method as claimed in claim 1, wherein the tree structure resides in one of a main memory and a disk.

9. A system for processing a query for searching XML data, comprising:
   a XML query parser that receives an input document from a user and parses said input XML document to generate a reconstructed input XML document;
   a XML path expression reducer that receives said reconstructed input XML document, traverses a XML Instance Structure (XIS) tree to check for duplication of nodes, and returns a shortest path expression to said XML query parser, wherein said XIS tree includes nodes other than nodes duplicated in said input XML document, and stored as a tree structure; and
   a XML query processor that receives said returned shortest path query from said XML query parser, performs said query by extracting a result from a XML database, and provides said result to said user.

10. The system of claim 9, wherein said XIS tree is constructed based on an actual structure of said input XML document, and neither shared nodes nor recursive nodes are present in said XIS tree.

11. The system of claim 10, wherein when a parent node has a plurality of child nodes in said input XML document, only one of said child nodes is registered in said XIS tree.

12. The system of claim 9, wherein said XIS tree is generated while said input XML document is loaded, and nodes are added to said XIS tree in accordance with a tree traversal algorithm.

13. The system of claim 12, where said tree traversal algorithm comprises at least one of a pre-order algorithm, an in-order algorithm, and a post-order algorithm, and said traversing occurs during said parsing by said XML query parser.

14. The system of claim 9, wherein said XIS tree is stored in one of a XML format and a relational database.

15. The system of claim 9, wherein said shortest path expression is generated based on a path expression reduction algorithm that converts a path expression in said input XML document into a shortest path expression among an equivalence class to which said path expression belongs, through said XIS tree.

16. The system of claim 9, wherein a path expression P in the query is represented as $P=A_1N_1 A_2N_2 \ldots A_kN_k$ and is classified into a Head section, an $A_iN_i$ section, and a Tail section when a length of the path expression is k.

17. The system of claim 16, wherein the $A_iN_i$ section denotes first to i-th <axis-node> pairs for the path expression P, the Head section is a part in which reduction has been made among lists of the <axis-node> pairs located before the $A_iN_1$ section, and the Tail section is a part in which the reduction has not yet been made among lists of the <axis-node> pairs located after the $A_iN_i$ section.

18. The system of claim 16, wherein said XML path expression reducer generates the shortest path expression by searching the first to i-th <axis-node> pairs and the $A_iN_i$ section to determine whether respective the first to i-th <axis-node> pairs can be deleted.

19. The system of claim 18, wherein said XML path expression reducer performs the determining whether respective pairs can be deleted by, searching a node of the Tail section from a sub-tree in which a node indicated by the Head section becomes a root node, deleting the AiNi section when the node of the Tail section has a prefix AiNi, and changing an axis of the Tail section from '/' to '//'.

20. The system of claim 9, wherein the XIS tree resides in one of a main memory and a disk.

* * * * *